(12) United States Patent
Rotter

(10) Patent No.: US 8,656,665 B2
(45) Date of Patent: Feb. 25, 2014

(54) MULTI-LAYER HEAT INSULATING PANE ELEMENT

(75) Inventor: Thomas Rotter, Hochheim-Massenheim (DE)

(73) Assignee: Thomas Rotter, Hochheim-Massenheim (DE)

( * ) Notice: Subject to any disclaimer, the term of this patent is extended or adjusted under 35 U.S.C. 154(b) by 463 days.

(21) Appl. No.: 12/934,213

(22) PCT Filed: Mar. 24, 2009

(86) PCT No.: PCT/EP2009/002140
§ 371 (c)(1),
(2), (4) Date: Dec. 13, 2010

(87) PCT Pub. No.: WO2009/118149
PCT Pub. Date: Oct. 1, 2009

(65) Prior Publication Data
US 2011/0258921 A1      Oct. 27, 2011

(30) Foreign Application Priority Data

Mar. 26, 2008 (EP) .................................. 08005606
Oct. 16, 2008 (EP) .................................. 08018167

(51) Int. Cl.
*E06B 3/24* (2006.01)
*E06B 3/66* (2006.01)

(52) U.S. Cl.
USPC .. 52/204.6; 52/209; 52/204.593; 52/204.597; 428/34.1

(58) Field of Classification Search
USPC ........ 52/786.11, 786.1, 786.13, 788.1, 789.1, 52/663, 316, 314, 311.3, 204, 204.59, 52/204.593, 745.9, 204.62, 209, 204.5, 52/204.6, 204.591; 428/34, 38, 34.1
See application file for complete search history.

(56) References Cited

U.S. PATENT DOCUMENTS

| 4,198,796 | A | * | 4/1980 | Foster ............................. 52/203 |
| 4,275,801 | A | * | 6/1981 | Bschorr ......................... 181/290 |
| 6,055,783 | A | * | 5/2000 | Guhl et al. ................... 52/204.62 |
| 6,250,027 | B1 | * | 6/2001 | Richards ..................... 52/204.59 |

FOREIGN PATENT DOCUMENTS

| DE | 23 49 401 |  | 4/1975 |
| DE | 28 02 179 | A1 | 7/1979 |
| DE | 33 15 623 | A1 | 1/1984 |
| FR | 947 077 | A | 6/1949 |
| JP | 57140342 | A * | 8/1982 |

* cited by examiner

*Primary Examiner* — Jeanette E. Chapman
(74) *Attorney, Agent, or Firm* — Reising Ethington PC

(57) ABSTRACT

The invention concerns a multi-layered heat insulating window panel for constructing wall and/or roof surfaces of a greenhouse, comprising:
a frame structure, a first pane (12), particularly a customary glass pane which has an edge that is framed and attached in the frame structure and which is kept in position by the frame structure, and a supplementary pane, for example, deep drawn from plastic material, a supplementary pane on at least one surface of the first glass pane, forming a double-glazing arrangement, wherein the supplementary pane has a tray-like shape and the circumferential edge region is glued hermetically to the first pane and wherein the cavity is evacuated and in the interior the supplementary pane is supported by means of a number of supporting elements in order to prevent the pane from collapsing because of the external atmospheric pressure.

13 Claims, 4 Drawing Sheets

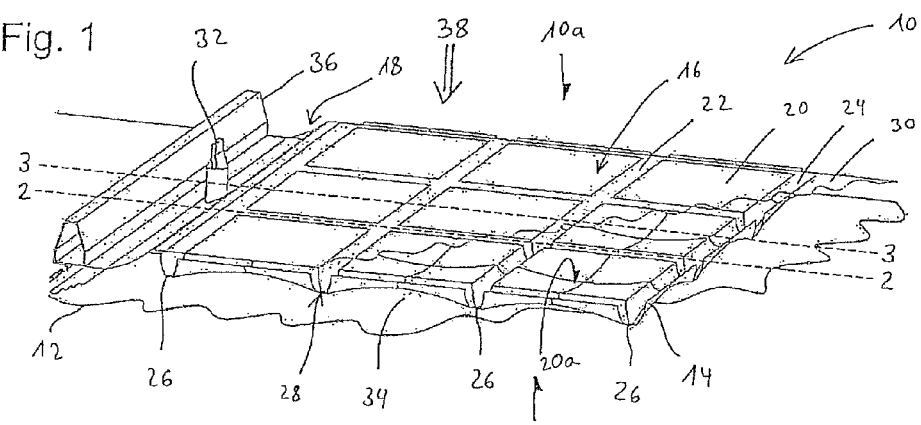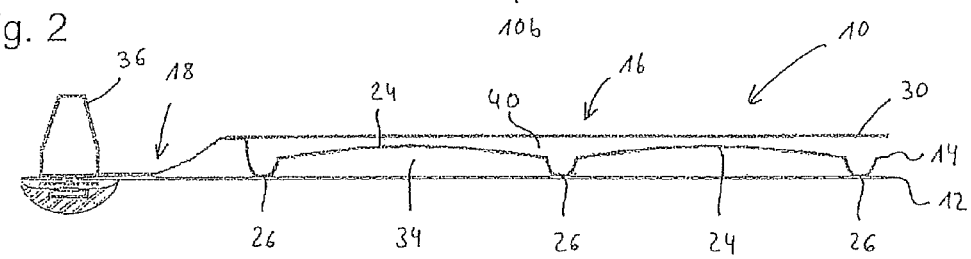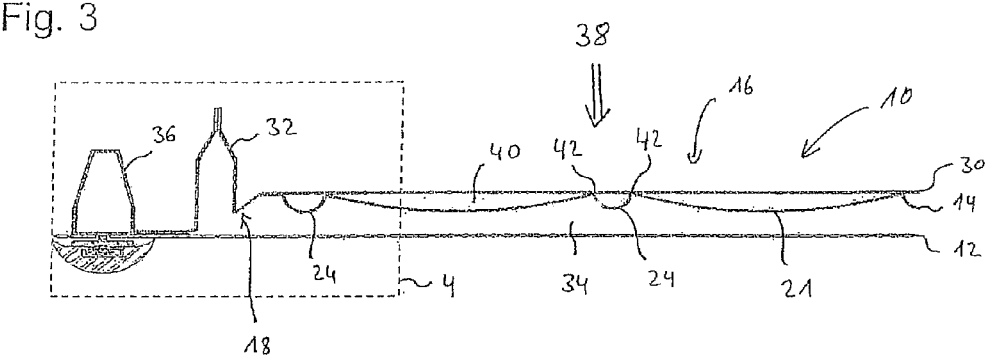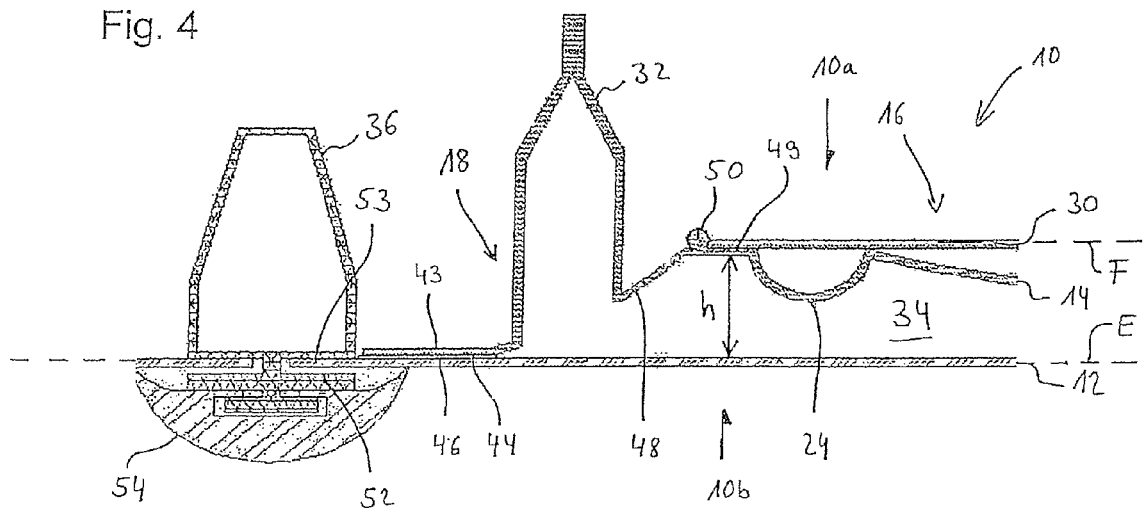

MULTI-LAYER HEAT INSULATING PANE ELEMENT

FIELD OF INVENTION

The invention at hand concerns a multi-layered window panel with a molded supplementary pane, especially for heat insulation of greenhouses.

BACKGROUND OF THE INVENTION

Greenhouses are used especially in middle latitudes and provide a more consistent and warmer climate than outdoor cultivation. Therefore, greenhouses are heated, if required or modern greenhouses are air-conditioned in the summer, which results in high power consumption. Previous improvements of the energetic efficiency of greenhouses have resulted especially in more cost-effective energy production or an improvement of the heating system. However, by improving heat insulation a better saving potential can be achieved.

It is known to use double-skin sheets and multi-layer cross-braced plates consisting of transparent plastic material, as well as double glazed windows to improve the insulation of transparent buildings, such as greenhouses. Furthermore, underneath foils or special screen installations to save energy are put into greenhouses, for example (AT 503 879 A1).

Double-skin sheets have the disadvantage that during a period of between 8 and 22 years they loose transparency and stability. When insuring a building covered with transparent plastic material, the refund amount of the insurance companies decreases during the product lifetime in a period of between 8 and 22 years, depending on the material. Thus the refund amount decreases from 100% to 0%.

Because of the heavy weight, double glazed windows have the disadvantage that the greenhouses require a stronger construction. Double glazed windows are rarely used for greenhouses because the material, as well as the reinforcement of the structure are very expensive.

Energy shields have the disadvantage of an expensive installation, even with a respective provision for opening and closing. The durability lies between 6 and 10 years. Underneath foils last only 2 to 5 years.

In AT 503 879 A1, the suggestion is made to insert an air cushion between two energy shields or two sheets of foil. Insurance companies calculate the durability of such materials at up to 8 years. It is therefore debatable how the insulation effect has been reduced already after 4 years. What is more, up to the energy shield the pediment region of the greenhouse is not insulated, requiring an increased heat output at the start of the day when the energy shield is opened.

Also known is vacuum insulated glass (VIG). Here individual columns are arranged between two glass panes. Even in this case the high weight and expenses are disadvantageous. In addition, it is difficult to produce a vacuum-tight connection between two float glass panes.

SUMMARY OF THE INVENTION

The invention at hand is based on the objective of providing a window arrangement which has a high capacity for heat insulation and a low weight, and which is cost-effective and durable.

The invention also has the objective of providing an insulation system which is suitable for greenhouses and which can improve the heat insulation of pre-existing greenhouses by means of subsequent installation.

The objective of the invention is achieved by means of the subject matter of the independent claims. The sub-claims describe advantageous developments of the invention.

The invention provides a multi-layered heat insulating window panel for the construction of wall and/or roof surfaces of a greenhouse. The window panel is formed by an at least double-glazing arrangement consisting of a first pane, for example, a customary planar float glass pane, and a specially formed supplementary pane which is connected with the first pane in vacuum-tight manner. As a result, the greenhouse consists of a customary frame structure for the walls and the roof into which several of these double-glazing arrangements are inserted to form the walls and the roof of the greenhouse.

The translucent supplementary pane has a structure that allows the air between supplementary pane and first pane to be evacuated. For this purpose, the supplementary pane has a tray-like shape with an inner window area and an edge region, which forms a securing rim, surrounding the window area. The edge region comprises an outer sealing frame with a circumferential seal and a connecting frame which connects the sealing frame and the window area. At the same time, the connecting frame extends vertically or transverse to the window plane so that the window area and the sealing surface are offset in parallel in relation to the window plane and the window area is mostly spaced apart from the first pane. As a result, a cavity is formed in the window area in sandwich-like manner between the first pane and the supplementary pane.

The circumferentially extending sealing surface of the securing rim is connected with the first pane in such a way that it forms a hermetic seal all the way around the edge region, thus sealing the cavity or box section between the first pane and the supplementary pane in vacuum-tight manner when the sealing surface of the supplementary pane is, for example, glued to the first pane.

Among other things, it is difficult to achieve sufficient stability because such panes or window arrangements usually comprise large surfaces, exerting high pressure on the panes when the cavity is evacuated. Proportionally to the gas pressure difference between the cavity and the external atmosphere, i.e., under complete evacuation, the pressure amounts to approximately $10^5$ $Nm^{-2}$. This corresponds to 10 tons per square meter.

Therefore, the first pane and the supplementary pane are supported against one another by several supporting elements which are distributed in a grid pattern across the inner window area of the supplementary pane in order to resist the external pressure and prevent the pane from collapsing.

It is of special advantage to design the supporting elements, the connecting frame and the sealing surface in such a way that they form one piece with the supplementary pane. For this purpose, the supplementary pane is designed in the form of a plastic molding having an integral supporting structure. As a result, the supporting elements are an integral part of the supplementary pane, arranged in point by point or pillar-like manner, and extend transverse to the window plane. Thus a supporting grid is formed as an integral part of the supplementary pane and the supporting elements maintain a predefined maximum spacing in order to resist the external atmospheric pressure. The integral supporting grid divides the window area in cells which have a supporting element at each corner. The cells are not hermetically insulated from one another but are connected between the supporting elements in order to allow air circulation to take place between the cells so that all cells can be evacuated consistently.

In particular, the supplementary pane is produced by warping an ordinary plane, thin air-permeable plastic sheet, for example, deep-drawn. In this case, the supporting elements, the connecting frame and/or the sealing surface are molded integrally from a single malleable sheet and the supporting elements are designed in the form of hollow pillars. For this purpose, it is appropriate to use especially thin thermoplastic plastic sheets, for example, PMMA, PVC, polycarbonate, or PET sheets. For PET sheets, it is preferable to use the non-crystallizing type of polyethylene terephthalate, the so-called PETG. However, the supplementary pane can also be produced in one piece, for example, from epoxy, polyester or fiber glass plastic material. Preferably, the supplementary pane comprises an integral supporting structure which protrudes from one surface of the supplementary pane and leaves a corresponding negative impression on the other surface of the supplementary pane.

The stability of the supplementary pane is primarily defined by the thickness of the sheet and the spacing of the supporting grid. Preferably, the plastic sheet should be approximately between 0.5 mm and 5 mm thick, and the spacing of the supporting grid should preferably be no larger than approximately 6 cm in order to guarantee sufficient stability. When using 1.5 mm PMMA, it is suggested to use a supporting grid spacing of 4 cm. With a 4 cm×4 cm surface for each grid and an assumed complete evacuation, the force per grid element or cell amounts to 160 N (corresponding to approximately 16 kg). Thus, it is possible to produce double-glazing arrangements of almost unlimited size. At least, it is possible to produce arrangements of the size typical for glass panes used in greenhouses or windows (in the range of 1 sqm or more).

When the first pane and the supplementary pane are hermetically connected with one another, the cavity or box section between the two panes is evacuated, wherein the supporting grid supports the supplementary pane against the glass pane. It is obvious that "evacuation" used in this sense does not necessarily mean complete evacuation. Depending on the requirements and stability of the supplementary pane, partial evacuation could also be sufficient, for example, evacuation to an internal pressure of several hundred hPA or even a different internal pressure.

Preferably, for use in a greenhouse the supplementary pane should consist of a clear, transparent plastic material. Preferably, when using a clear, transparent plastic material, the upper surfaces of the cells should also be clear, transparent so that basically the double-glazing arrangement provides a relatively clear, transparent window impression, particularly allowing a view through the double-glazing arrangement. Because of the structure of the supplementary pane, the clearness of the invention-based double-glazing arrangement is somewhat reduced when compared to a planar float glass pane. However, for use in a greenhouse this does not present too big of a disadvantage. In specific applications, it can even be of advantage to use an opaque plastic material in order to achieve light scattering which will result in an even light distribution, or to avoid see-through sidewalls. Depending on the requirements, the invention-based supplementary pane can also be used on windows or window fronts of halls and normal buildings.

In an advantageous way, evacuation considerably reduces heat conductivity, resulting in the fact that the invention-based double-glazing arrangement has a low U-value. The principle is the same as for a thermos flask. Using an integral molded point by point supporting grid, that is a supporting grid supported selectively on the first pane, has, on the one hand, the advantage that it can be produced in a simple, cost-effective manner and, on the other hand, it presents only a low thermal bridge. Customary single glazed windows of greenhouses have a U-value of approximately 5.7 W/(m$^2$K). Preferably, the double-glazing arrangement has a U-value lower than 3 W/(m$^2$K). There is also the additional benefit of a sound insulation improvement.

By means of the invention at hand, depending on the design, it is possible to save energy in greenhouses of up to 80% or more when compared to single glazing windows with energy shield.

Since in the summer heat is also insulated, further energy is saved for increasing the air moisture, for example, with demineralized water, as well as for ventilating in case of excessive heat. In new buildings, it is possible to substitute ventilation through heat exchange with a heat storage tank. Thus it is possible to produce energy for the relatively low energy demand in early summer and late summer. Especially in spring and late autumn when the outside temperatures are low but sunshine is still strong, the use of the "greenhouse effect" is not or only insignificantly affected by the supplementary pane. The heat conductivity of the residual gas between the two panes is reduced, depending on the quality of the vacuum, and thermal convection is limited. Heat radiation can still be controlled by means of the energy shield.

The additional weight of the supplementary pane molded from a thin plastic sheet amounts to 1.7 kg/m$^2$ when a 1.5 mm PMMA sheet is used, and 1.4 kg/m$^2$ when a 1 mm PVC sheet is used. Therefore the total weight of the supplementary pane should range between 1 kg/m$^2$ and 10 kg/m$^2$. To improve the gas barrier properties and prevent condensation, the plastic sheet can be coated, for example with resin or silicon oxide ($SiO_2$). However, it is also possible to use thin shaped panes of glass for the supplementary pane. To reduce thermal radiation, the first pane and/or the supplementary pane can be provided with a metal-coated surface. Furthermore, it is possible to laminate the plastic sheet with a plastic impermeable to water vapor and/or a plastic sheet provided with a metal-coated surface.

The supplementary pane can be retrofitted under a smooth glass surface, and the arrangement can be easily evacuated by means of a vacuum pump. It is not necessary to change the structure of the greenhouse, especially the frame structure.

The UV sensitivity of plastic materials could present a problem. It is therefore preferred to mount the supplementary pane on the glass surface turned away from the sun, i.e., on the interior side of the greenhouse. Since glass considerably reduces UV radiation, the supplementary pane consisting of plastic material has a longer life than plastic material exposed to direct sun light.

Preferably, merely the edge of the glass pane is enclosed in the frame structure of the greenhouse. The supplementary pane is a little smaller than the glass pane and is merely glued to the glass pane. However, the supplementary pane itself is not enclosed in the frame structure. Consequently, the supplementary pane is at least slightly smaller than the respective opening of the frame structure so that it is possible to insert the supplementary pane subsequently. It is also possible to glue several supplementary panes as sub-elements on a glass pane. However, in newly constructed greenhouses, it is also possible to insert the supplementary pane together with the first pane in the grooves of the frame structure of the greenhouse, wherein at least parts of the sealing frame, in particular, are located in the grooves, thus improving transparency.

A special advantage of the invention is the ability to retrofit on-site single-glazed windows already installed in a greenhouse. For this purpose, the supplementary pane is preferably attached to the interior surface of the glass pane that is mounted in the frame structure of the greenhouse, and the sealing frame that defines the edge of the supplementary pane is hermetically glued to the glass pane. To this end, it is appropriate to use, for example, contact adhesive, epoxy or a two-component adhesive which guarantee adequate and durable tightness. In addition, so-called two-component, no-mix adhesives have stood the test, in which both adhesive surfaces are coated with respectively different adhesive components and the components mix as soon as the surfaces are pressed together. These adhesives usually require only a fusing time of a few minutes. In addition, the adhesive surfaces can be secured with a duct tape. It is also possible to seal the sealing frame with a non-adhesive rubber seal, wherein the support during installation between the supplementary pane and the first pane is provided by the vacuum. An additional adhesion assures the durable attachment of the supplementary pane. It can be practical to provide a molded depression in the sealing frame in order to accept the rubber seal or adhesive. Subsequently, a vacuum pump is attached to a suction nozzle and the cavity is evacuated. It is very easy to mold the suction nozzle as an integral part of the supplementary pane and then melt it in thermoplastic manner after the process of evacuation is completed. However, it is also possible to install a multiple use vacuum valve, which has the advantage that the evacuation process can be repeated if required. It is also possible to connect several double-glazing arrangements in such a way that they can be connected to a single vacuum pump, for example, by means of vacuum connectors. By using vacuum valves that can be opened and closed repeatedly, the cavity can be specifically ventilated and evacuated, as required, thus controlling the insulation effect.

For the installation process, it can be advantageous to design the supporting elements in such a way that they are positioned vertically to the window plane and slightly offset toward the sealing surface. In this way, during installation, the adhesive can be applied to the supporting edge and thus the supplementary pane can be easily pressed against the glass pane. In this condition, the supporting elements do not yet touch the first glass pane. If now at least a small amount of air is evacuated, the supplementary pane is suctioned to the glass pane until the supporting elements are pressed against the glass pane where they are reinforced, wherein the adhesive is force-actuated and compressed. In this way, an excellent hermetic seal is provided, as well as a high contact pressure of the adhesive, which is especially advantageous if a contact adhesive is used.

In addition, it is preferred in the window area to mold from the supplementary pane additional integral stabilizing ribs which extend parallel to the window plane and which form, for example, two-dimensional crossed line grids in the window plane. Accordingly, the line grid consisting of stabilizing ribs divides the window area in several fields or cells. However, even in evacuated condition, it does not completely rest on the first pane so that the cavity cells of the respective window fields are connected to one another. Especially the point by point supporting grid is formed integrally with the line grid, wherein the supporting grid is designed more pronounced so that it is supported only selectively on the first pane. As a result, a consistent cavity is provided which can be evacuated as a whole. The stabilizing ribs provide additional stability for the supplementary pane and are also molded in one piece from the plastic sheet. For example, the line grid can be designed as a square checkerboard pattern. However, it can also be designed in different ways, for example, hexagonally.

In a preferred embodiment, the supporting elements have been arranged at the intersections of the line grids, forming a two-dimensional crossed bridge structure with the supporting elements acting as bridge pillars and the stabilizing ribs as arches between the bridge pillars. However, it is also possible to arrange the supporting elements inside the window fields.

Further stability can be achieved by warping the supplementary pane in the respective fields. Depending on the material, the arch can be directed to the inside or to the outside (tension or compression arch).

By molding the supporting elements and, where required, the stabilizing ribs from thin sheet material, depressions in the form of a negative mold of the supporting elements and, where required, the stabilizing ribs are produced on the surface facing away from the glass pane. Among other things, these depressions can be protected from the penetration of dirt by applying an additional sheet or foil to the rear surface of the supplementary pane which faces away from the first pane. If desired, the space between the additional sheet or foil and the supplementary pane can also be evacuated. For this purpose, an opening, which connects the two cavitys with one another, can be provided in the supplementary pane. In this case, the additional sheet or foil is hermetically glued to the rear surface of the supplementary pane, preferably to the rear surface of the circumferential edge region of the supplementary pane.

Furthermore, the supplementary pane can comprise connecting elements by means of which several supplementary panes can be placed next to each other on a glass pane. What is more, the supplementary pane as a whole can have a curved shape in order to be adapted to arched panes.

Subsequently, the invention is explained in more detail by means of embodiments and reference to the figures. To some extent, identical or similar elements are provided with the same reference signs and the characteristics of the different embodiments can be combined.

BRIEF DESCRIPTION OF THE FIGURES

It is shown:
FIG. 1 a partially exposed perspective view of a first embodiment of the invention,
FIG. 2 a cross section along the line 2-2 in FIG. 1,
FIG. 3 a cross section along the line 3-3 in FIG. 1,
FIG. 4 a detail enlargement of region 4 in FIG. 3,
FIG. 5 a partially exposed perspective view of a second embodiment of the invention,
FIG. 6 a cross section along the line 6-6 in FIG. 5,
FIG. 7 a cross section through a modified embodiment of the invention,
FIG. 8 a partially exposed perspective view of a further embodiment of the invention,
FIG. 9 a cross section along the line 9-9 in FIG. 8,
FIG. 10 a cross section through a section of a further embodiment of the invention,
FIG. 11 a section from FIG. 10.

DETAILED DESCRIPTION OF THE INVENTION

Figure 5:
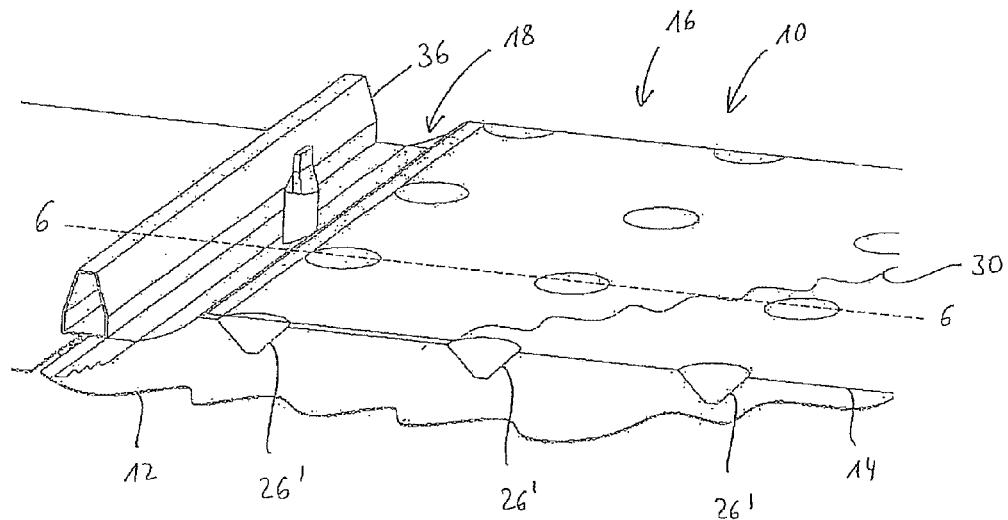

With reference to FIG. 1, the multi-layered heat insulating window panel 10 comprises a customary planar float glass pane 12 with a typical thickness of 2 mm to 4 mm. The invention-based supplementary pane 14 shown in the figures is glued from the top to the float glass pane 12. It has to be noted that the upper surface 10a shown in the figures corresponds in reality to the interior surface of the greenhouse, this means, for example, with reference to roof surfaces, that in reality upper surface 10a shown in the figures extends slightly downward. As a result, the supplementary pane 14 is positioned on the surface 10a facing away from the exterior surface 10b, representing the surface of solar radiation.

The supplementary pane 14 comprises an inner window area 16 and a securing rim 18 surrounding the window area 16. The window area 16 is divided in a number of, in this case, square fields or cells 20 which are formed by a grid 22 of beads impressed in the direction of the float glass pane 12 crossed in longitudinal and transverse direction. The beads 24 molded in the direction of the float glass pane 12 form stabilizing ribs.

In this embodiment, the upper surface 20a of the cells 20 is slightly arched in the direction of the float glass pane 12. At each intersection of the stabilizing grid 22 supporting elements 26 have been molded in the direction of the float glass pane 12. In this embodiment, the supporting elements are designed as a square point grid 28.

The window area 16 of the supplementary pane 14 is covered by a cover plate 30 which is glued to the edge region 18. On one surface of the edge region 18, a closed suction nozzle 32 has been arranged through which the cavity 34 between the supplementary pane 14 and the float glass pane 12 was evacuated. The window arrangement 10 is surrounded by frame profiles 36 forming a frame structure which keeps the entire arrangement in position.

With reference to FIG. 2, because of the evacuation of the cavity 34, the float glass pane 12 supports the supporting elements against the external atmospheric pressure indicated by arrow 38. The stabilizing ribs or beads 24 form bridges between the supporting elements 26. In this example, the cavity 40 formed between the supplementary pane 14 and the cover plate 30 by the arching 21 of the cells 20 and the depressions of the stabilizing ribs or beads 24 and supporting elements 26 is not evacuated. However, as shown in FIG. 3, it can be evacuated because the cover plate 30 can be sufficiently supported at the boundary edge 42 of the cells 20.

With reference to FIG. 4, the circumferential edge region 18 of the supplementary pane 14 has all around the edge a sealing frame 43 with a sealing surface 44 which, in this example, is glued vacuum-tight with a contact adhesive 46 to the float glass pane 12 all the way around the surface. The edge region 18 also comprises a circumferential intermediate or connecting frame 48, which connects in vacuum-tight manner the sealing surface 44 with the window area 16. In this example, the connecting frame 48 raises laterally to plane E of the float glass pane 12. In this way, the height difference h between the window area 16 and the sealing surface 44 is provided, producing a parallel space between plane F of the window area 16 and the float glass pane 12 in order to form the evacuated cavity 34.

The edge region 18 also comprises a ridge in the form of a cover frame 49 which runs in plane F and on which the cover plate 30 is glued with an adhesive 50 all the way around. Since we are dealing here with a plastic to plastic connection, other bonding methods, such as fusing processes, can also be used.

The frame profiles 36 comprise a retaining groove 52 into which the float glass pane is inserted and attached in a conventional manner. Consequently, the edge of the float glass pane forms the assembly edge 53 of the double-glazing arrangement. The supplementary pane 14 is designed to be smaller than the float glass pane 12 so that the supplementary pane 14 can be inserted subsequently in the frame structure formed by the frame profiles 36. This means that the supplementary pane 14 does not have to be inserted in the retaining groove 52. It is kept in position on the float glass pane 12 only by means of the adhesive 46 and the atmospheric pressure. A customary covering sleeve 54 protects the frame profile 36, as well as the retaining grooves 52 from penetration of dirt and moisture, because the bottom side 10b is the exterior surface of the greenhouse.

Figure 6:
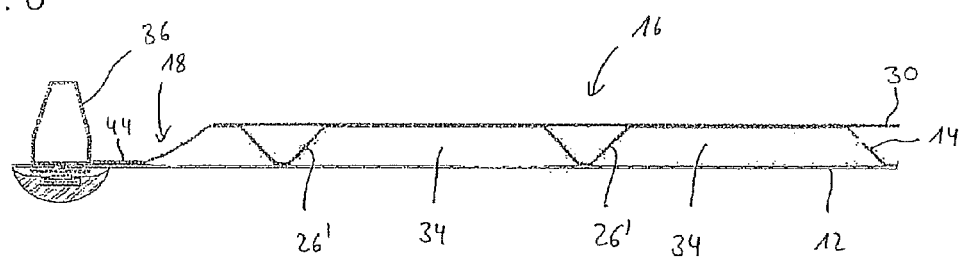

FIG. 5 shows a further embodiment of the invention in which the supporting elements 26' are impressed in the sheet material of the supplementary pane 14 in truncated cone-shaped manner in the direction of the float glass pane 12. FIG. 6 clearly shows that this embodiment does not make use of the stabilizing ribs or beads 24 and arching 21 of the window area 16.

Figure 7:
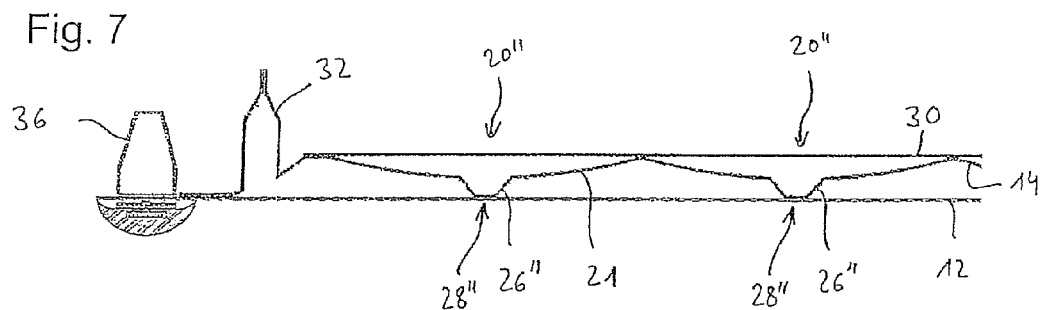

FIG. 7 shows a further embodiment of the invention, in which the different cells of the supplementary pane 14 are again curved inwards 21, and each supporting elements 26" of the supporting grid 28" are located inside each cell 20" with an arched top surface.

Figure 8:
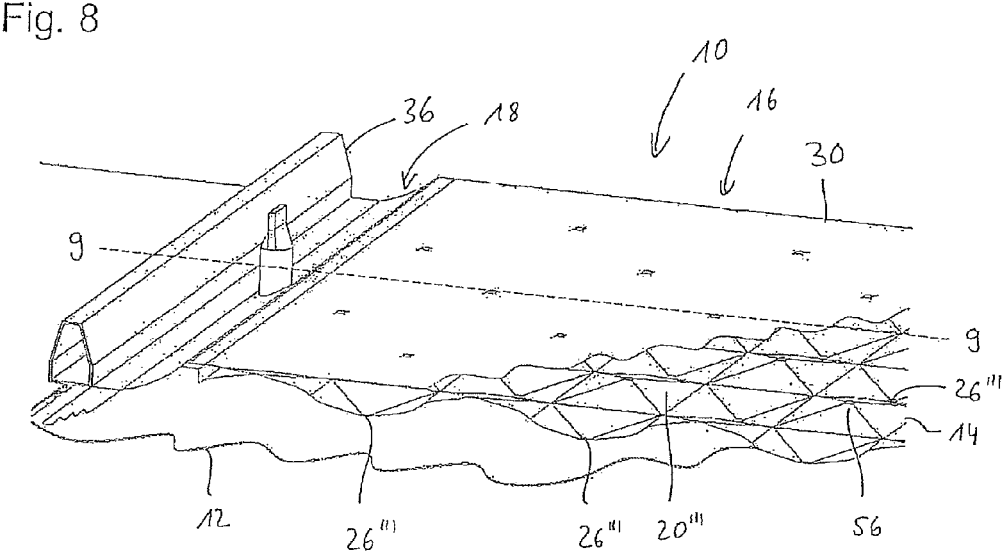

FIG. 8 shows a further embodiment of the invention, in which the window area 16 of the supplementary pane 14 are molded in truncated pyramid shape alternately towards the float glass pane and away from the float glass pane 12. The truncated pyramid shaped design also divides the window area 16 in fields or cells 20'". The truncated tops of the truncated pyramids molded in the direction of the float glass pane 12 form the supporting elements 26'" which support the supplementary pane 14 against the float glass pane 12. In this embodiment, the elevations 56 also designed as truncated pyramids and pointing away from the float glass pane 12 form a point by point supporting grid for the cover plate 30.

Figure 9:
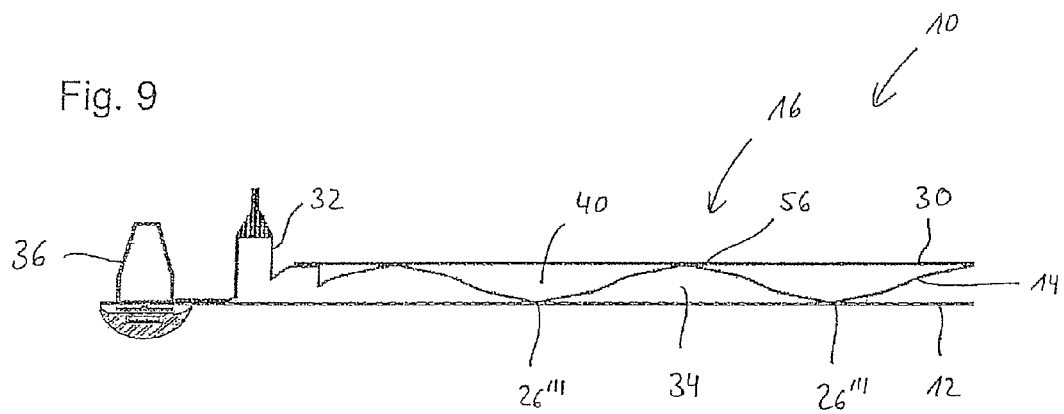
Figure 10:
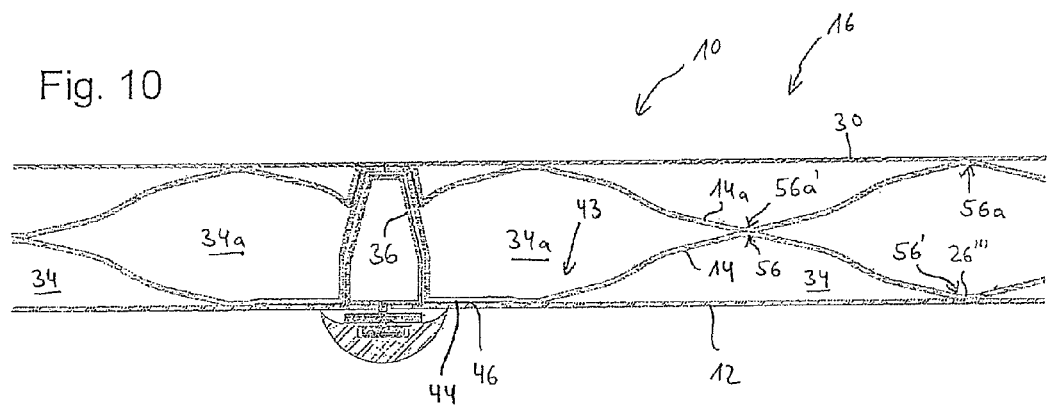
Figure 11:
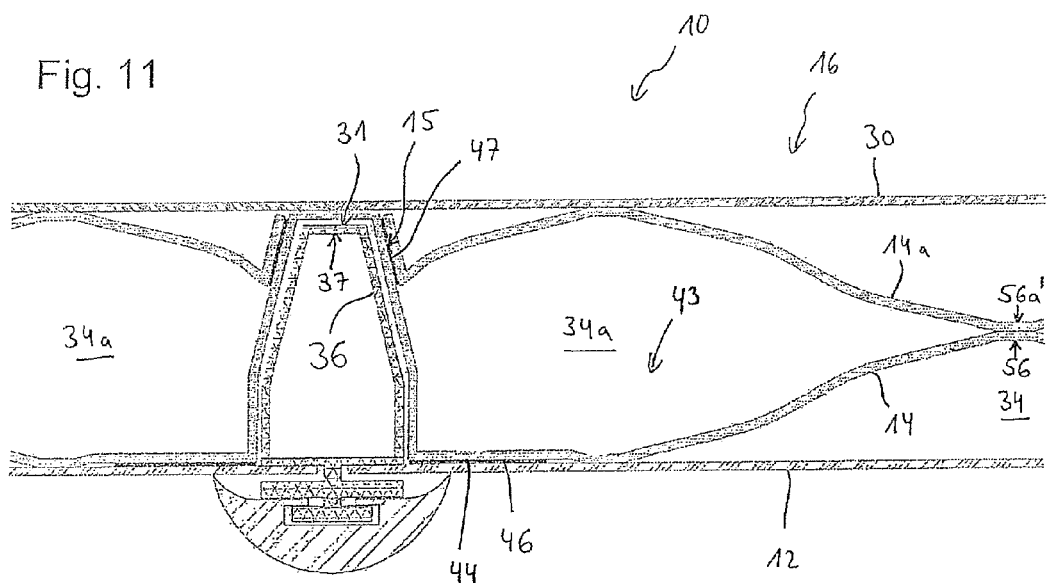

FIG. 10 and FIG. 11 show a further embodiment of the invention, in which the supplementary pane 14 is designed in a way similar to the one in FIGS. 8 and 9 and in which the supplementary pane 14 is hermetically glued with an adhesive 46 in a circumferential manner to the first pane 12. The supplementary pane comprises elevations 56 and depressions 56' which alternately point in opposite directions, i.e., away from the first pane 12 or in the direction of the first pane 12 which, in this example, are designed as truncated pyramids 56, 56'. Consequently, the point by point supporting elements 26'" are formed by the truncated pyramids 56'. This embodiment comprises a second molded supplementary pane 14a which is attached to the first supplementary pane and which is also supported on the first supplementary pane in selective manner in order to evacuate also the cavity 34a between the first and the second supplementary pane 14, 14a. The first and second supplementary pane 14, 14a are here basically designed in a similar way and placed on top of each other in mirrored manner. As a result, the depressions 56a' of the second supplementary pane 14a are placed on the elevations 56 of the first supplementary pane 14 and are supported by it. The second evacuated cavity 34a is formed by the fact that the elevations 56a of the second supplementary pane 14a are spaced from the depressions 56' of the first supplementary pane 14. The optimum cover plate 30 is attached to the second supplementary pane 14a. The evacuated cavity 34a between the first and second supplementary pane 14, 14a covers the sealing frame 43 and the sealing surface 44, thus improving the heat insulation. The first and second supplementary pane 14, 14a are also hermetically glued together with an adhesive 47 in a circumferential manner at the place designated with 15. Here, this adhesion is arranged in the inward pointing area 37 (in the direction of the interior of the greenhouse) of the frame profile 36 in order to further improve heat insulation. By covering the frame profile 36 with parts of the arrangement, in this case with the first supplementary pane 14 and the cover plate 30 at the place designated with 31, the frame profile 36 is protected against dirt and moisture also in the inside.

All embodiments have in common that the supplementary pane 14 is designed as a layered plastic molding, or as an integral part of the plastic sheet. As a result, the supporting elements 26 to 26'" are molded and impressed, for example, from the plastic sheet from which the supplementary pane 14 has been produced. Each supplementary pane 14 has a tray-like shape in which the window area 16 defines the bottom of the tray and the connecting frame 48 defines the edge of the tray which extends from plane F of the bottom of the tray. The tray-like shape defines a volume which is limited by the window area 16 and the circumferential connecting frame 48 and which forms the cavity 34 to be evacuated. Accordingly, the supplementary pane 14 together with the window area 16, which is supported by the supporting grid 28 to 28''' against the float glass pane 12, and the edge region form a tray-like or shell-like plastic molding, in which the supporting elements 26 to 26'', the connecting frame 48 and the sealing frame 43 are produced integrally with the window area 16. By molding the elements 18, 24, 26 to 26''', 43, 44, 48 from a thin sheet, the position structure facing the float glass pane 12 is reflected on the upper surface 10a as a negative structure.

To an expert it is obvious that the previously described embodiments are only to be considered as examples, and that the invention is not restricted to these examples. They can be varied in several ways without leaving the invention. It is also obvious that the characteristics, independent of whether they are disclosed in the description, the claims, the figures or otherwise, define even on an individual basis important features of the invention, even if they are described in combination with other characteristics.

The invention claimed is:

1. A multi-layered heat insulating window panel (10), comprising:
    a first pane (12) and
    a supplementary pane (14) on at least one surface of the first pane (12), forming at least one double-glazing arrangement,
    wherein the double-glazing arrangement comprises an assembly edge (53) which can be framed and attached in the frame structure (36) and which is kept in position by the frame structure (36) after being installed, wherein the supplementary pane (14) has a tray-like shape with an inner window area (16) and an edge region (18) surrounding the window area, wherein the edge region (18) has a sealing frame (43) with a circumferential sealing surface (44) and a connecting frame (48) which connects the sealing frame (43) with the window area (16), wherein the connecting frame (48) extends vertically or transverse to the window plane (E) so that the window area (16) and the sealing surface (44) are offset in parallel in relation to the window plane (E) and the window area (16) is mostly spaced apart from the first pane, forming a sandwich-like cavity (34) in the window area between the first pane (12) and the supplementary pane (14), wherein the sealing surface (44) forms a complete circumferential hermetic connection with the first pane (12) and the cavity (34) between the first pane (12) and the supplementary pane (14) is closed in vacuum-tight manner, wherein the window area (16) comprises a number of supporting elements (26, 26', 26'', 26''') protruding from the plane (F) of the window area, and wherein the supplementary pane (14) is designed in the form of a plastic molding, and the supporting elements in the direction of the first pane (12) are formed as an integral part of the supplementary pane (14) and form a supporting grid (28) with a pre-defined maximum spacing between the supporting elements, wherein the cavity (34) is evacuated and the supporting grid (28) of the supplementary pane (14) firmly supports the supplementary pane (14) and the first pane (12) against each other in order to prevent collapsing due to the external atmospheric pressure.

2. A window panel (10) according to claim 1, wherein the first pane (12) includes a planar float glass pane or a planar translucent plastic sheet.

3. A window panel (10) according to claim 1 or 2, wherein the supplementary pane (14) is installed on the surface (10a) of the first pane (12) facing away from the sun.

4. A window panel (10) according to claim 1, wherein the supplementary pane (14) with the supporting elements (26, 26', 26'', 26''') and the edge region (18) is deep drawn or integrally molded from a plastic sheet.

5. A window panel (10) according to claim 1, wherein the supplementary pane (14) consists of PMMA, PVC, PETG, polycarbonate, epoxy, polyester or fiber glass plastic material.

6. A window panel (10) according to claim 1, wherein the supplementary pane (14) is glued with an adhesive (46) to the first pane (12) between the sealing surface (44) and the first pane (12).

7. A window panel (10) according to claim 6, wherein the supporting elements (26, 26', 26'', 26''') are spaced from the first pane (12) in glued but not yet evacuated condition and only rest on the first pane (12) through the external atmosphere resulting from evacuation.

8. A window panel (10) according to claim 1, wherein in the window area (16) integral stabilizing ribs (24) are molded in the supplementary pane (14) which extend parallel to the plane of the window area (F) and form a two-dimensional crossed line grid (22) and divide the window area in several fields (20), wherein even in evacuated condition the line grid (22) does not completely rest against the first pane (12) pane so that the cavity cells of the respective fields (20) are connected to one another.

9. A window panel (10) according to claim 8, wherein the supporting elements (26, 26', 26'', 26''') are arranged at the intersections of the line grid (22), forming a two-dimensional crossed bridge structure, wherein the supporting elements (26, 26', 26'', 26''') are acting as bridge pillars and the stabilizing ribs (24) as arches between the bridge pillars.

10. A window panel (10) according to claim 8 or 9, wherein each field (20) in the supplementary pane (14) is warped.

11. A window panel (10) according to claim 1, wherein a sheet or foil is applied to the surface (10a) of the supplementary pane (14) facing away from the first pane (12).

12. A window panel (10) according to claim 11, wherein the complete circumference of the sheet or foil (30) is hermetically connected with a ridge of the edge region (18) of the supplementary pane (14) and the space (40) between the supplementary pane (14) and the sheet or foil (30) is evacuated.

13. A window panel (10) according to I claim 1, comprising a further molded supplementary pane (14a), which is attached to the supplementary pane (14) and in which the cavity (34a) between the first and second supplementary pane can be evacuated.

* * * * *